US008191772B2

(12) United States Patent
Anderson et al.

(10) Patent No.: US 8,191,772 B2
(45) Date of Patent: *Jun. 5, 2012

(54) METHOD FOR GENERATING CUSTOMER ONE-TIME UNIQUE PURCHASE ORDER NUMBERS

(75) Inventors: Roy Lee Anderson, Glendale, CA (US); William R. Bryant, Jr., Manassas, VA (US); Jacob Y. Wong, Goleta, CA (US)

(73) Assignee: Privasys, Inc., Tiburon, CA (US)

( * ) Notice: Subject to any disclaimer, the term of this patent is extended or adjusted under 35 U.S.C. 154(b) by 2300 days.

This patent is subject to a terminal disclaimer.

(21) Appl. No.: 10/968,399

(22) Filed: Oct. 18, 2004

(65) Prior Publication Data

US 2005/0080747 A1    Apr. 14, 2005

Related U.S. Application Data

(63) Continuation of application No. 09/960,714, filed on Sep. 21, 2001, now Pat. No. 6,805,288, and a continuation-in-part of application No. 09/667,089, filed on Sep. 21, 2000, now abandoned, which is a continuation-in-part of application No. 09/667,081, filed on Sep. 21, 2000, now abandoned, which is a continuation-in-part of application No. 09/659,434, filed on Sep. 8, 2000, now abandoned, which is a continuation-in-part of application No. 09/640,044, filed on Aug. 15, 2000, now abandoned, which is a continuation-in-part of application No. 09/619,859, filed on Jul. 20, 2000, now abandoned, which is a continuation-in-part of application No. 09/571,707, filed on May 15, 2000, now Pat. No. 6,592,044.

(51) Int. Cl.
*G06K 5/00* (2006.01)
*G06F 17/00* (2006.01)

(52) U.S. Cl. ...................................... 235/380; 235/375

(58) Field of Classification Search .................. 235/375, 235/380–382; 705/18, 39, 44
See application file for complete search history.

(56) References Cited

U.S. PATENT DOCUMENTS

| 5,317,636 | A  | * | 5/1994 | Vizcaino .......................... 705/65 |
| 6,609,654 | B1 | * | 8/2003 | Anderson et al. ............. 235/379 |
| 7,571,142 | B1 | * | 8/2009 | Flitcroft et al. ................. 705/44 |

(Continued)

*Primary Examiner* — Thien M. Le
*Assistant Examiner* — April Taylor
(74) *Attorney, Agent, or Firm* — Roy L Anderson; Wagner, Anderson & Bright, P.C.

(57) ABSTRACT

Multiple secure transactions are provided through use of a method that uses customer one-time unique purchase order numbers ("Coupons") generated by an algorithm that uses a permutated user key and a user insertion key as input variables. A user key (such as a Personal Identification Number, or "PIN") is combined with a permutation variable that is correlated with a customer sequence number to create the permutated user key. A random number generator is used to generate the user insertion key correlated with the customer sequence number. The algorithm can insert the permutated user key into a user account number through use of the user insertion key. A Coupon is validated by confirming that it is contained in a set of money source Coupons generated by a money source using the user key and a random number generator that is synchronized with the random number used to generate Coupons. Once a Coupon is validated, the matching money source Coupon and all earlier generated money source Coupons are deleted from the set, and a new set is generated. If a preselected number of Coupons are not validated for a chosen entity, an invalid user account number will be set. Coupons can be used for credit card or bank card transactions, and they can be generated without changing fixed digits of traditional twenty digit account numbers.

25 Claims, 1 Drawing Sheet

U.S. PATENT DOCUMENTS

| | | | |
|---|---|---|---|
| 7,793,851 B2 * | 9/2010 | Mullen | 235/493 |
| 7,844,550 B2 * | 11/2010 | Walker et al. | 705/74 |
| 7,853,529 B1 * | 12/2010 | Walker et al. | 705/55 |

* cited by examiner

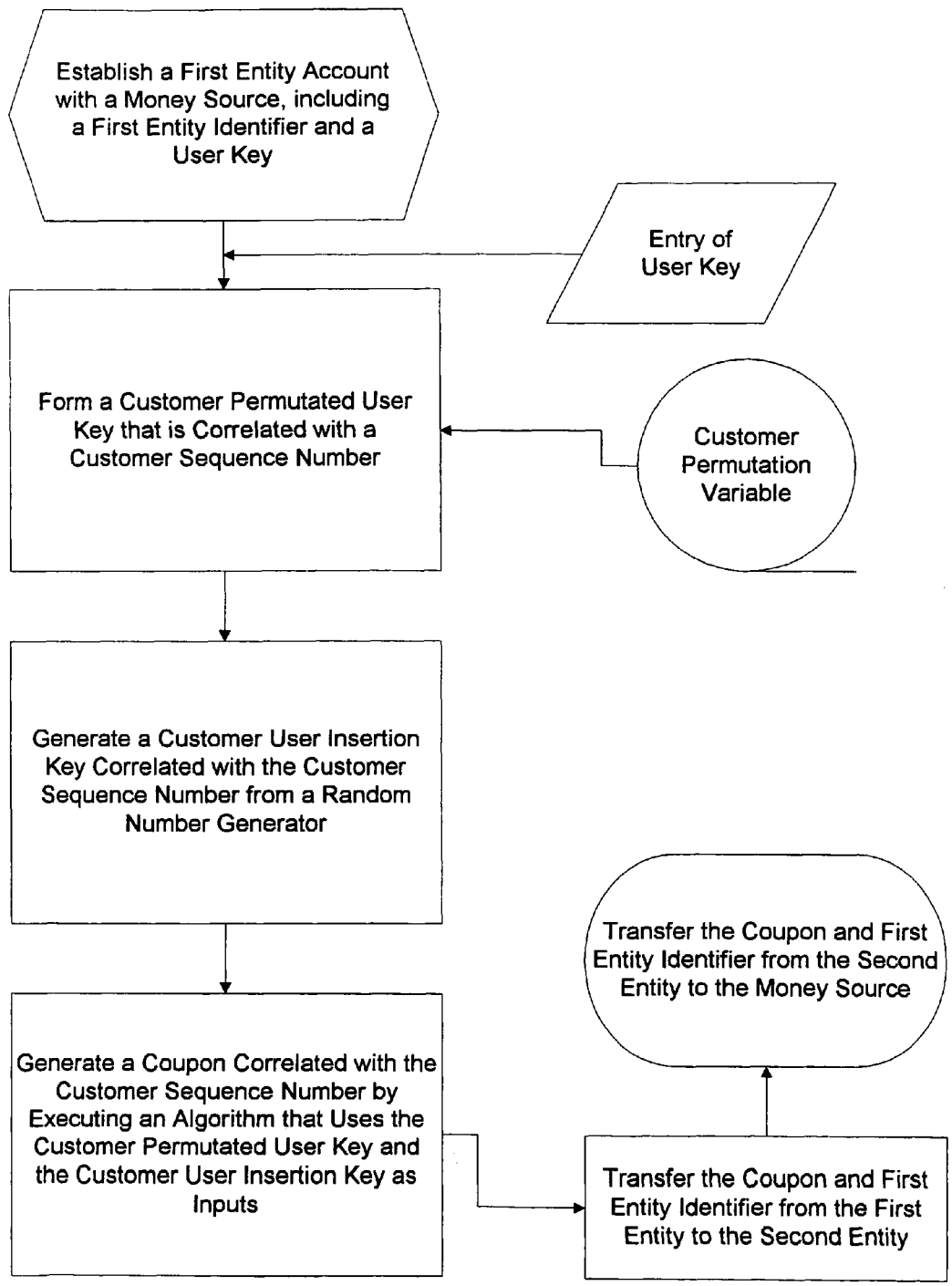

METHOD FOR GENERATING CUSTOMER ONE-TIME UNIQUE PURCHASE ORDER NUMBERS

CROSS REFERENCE TO RELATED APPLICATIONS

The present application is a continuation application of U.S. patent application Ser. No. 09/960,714, filed Sep. 21, 2001, now U.S. Pat. No. 6,805,288, which was a continuation-in-part application of U.S. application Ser. Nos. 09/667,081 filed Sep. 21, 2000, now abandoned and 09/667,089, filed Sep. 21, 2000, now abandoned which are continuation-in-part applications of U.S. Ser. No. 09/659,434, filed Sep. 8, 2000, now abandoned which is a continuation-in-part of U.S. Ser. No. 09/640,044, filed Aug. 15, 2000, now abandoned which is a continuation-in-part of U.S. Ser. No. 09/619,859, filed Jul. 20, 2000, now abandoned which is a continuation-in-part of Ser. No. 09/571,707, filed May 15, 2000 U.S. Pat. No. 6,592,044, all of which disclosures are specifically incorporated herein by reference. The present application continues the subject matter previously set forth in U.S. Ser. No. 09/640,044.

FIELD OF THE INVENTION

The present invention is in the field of electronic payment systems.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made prior to its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come up with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

Since the issuance of U.S. Pat. No. 5,956,699, Wong and Anderson have also invented an anonymous electronic card for generating personal coupons useful in commercial and security transactions, as well as a method for implementing anonymous credit card transactions using a fictitious account name. The present invention is an extension of these prior inventions that seeks to provide new methods for generating one-time unique numbers that can be used in credit card transactions in the brick and mortar world, e-commerce, m-commerce and in many other applications. Because the methodology is well suited for use in hardware and software applications, it has widespread applicability to many different types of transactions.

SUMMARY OF THE INVENTION

The present invention is generally directed to a method for generating customer one-time unique purchase order numbers ("Coupons"). An algorithm is executed that uses a permutated user key and a user insertion key as input variables to form a Coupon that is correlated with a sequence number. Combining a user key with a permutation variable correlated with a sequence number forms the permutated user key. A random number generator generates the user insertion key that is correlated with the sequence number. The sequence number can be changed after each Coupon is generated and a new Coupon can then be generated using a new permutation variable correlated to the changed sequence number.

In a first, separate aspect of the present invention, the algorithm used to generate a Coupon inserts the permutated user key into a user account number. After a Coupon is generated, it is transferred with a first entity identifier to a second entity (which can actually be several entities), which then transfers the information to a money source repository. An individual Coupon is verified as being valid by confirmation that it matches a money source Coupon stored in a sequential set having a preselected number of money source Coupons for the first entity. The money source Coupons are generated in a similar fashion as Coupons, except that they are generated for the money source. Thus, a money source Coupon will be identical to a Coupon when the customer sequence number and the money source sequence number are identical (the customer random number generator and the money source random generator can also be resynchronized from a first setting to a second setting). Once a Coupon is verified as valid, the matching money source Coupon and all earlier created money source Coupons are deleted from the sequential set and a new sequential set is generated. If a preselected number of Coupons are not verified, an invalid user account number condition is set to prevent further attempts to verify Coupons for the first entity.

In another, separate aspect of the present invention, a Coupon can also be verified as being valid if it is identical to a matching money source Coupon contained in a recent history file that contains one or more money source Coupons deleted from the sequential set within a specified length of time. Such verification may also require independent verification of the validity of the Coupon.

In still another, separate aspect of the present invention, an electronic card that allows the user key to be entered into an input device generates Coupons, and the Coupons can be readable by a magnetic card reader. The sequence number can be changed each time a user key is entered into the input device.

In yet another, separate aspect of the present invention, the account number has two sets of variables—a set of fixed variables, and a set of variable variables. The fixed set of variables is not changed by creation of a Coupon, and the customer permutated user key can be inserted into the variable set of variables that may contain nine or fewer digits when the account number is twenty numeric digits.

Accordingly, it is a primary object of the present invention to provide a method for generating customer one-time unique purchase order numbers.

This and further objects and advantages will be apparent to those skilled in the art in connection with the drawings and the detailed description of the preferred embodiment set forth below.

BRIEF DESCRIPTION OF THE DRAWING

FIG. 1 is a simplified, schematic diagram of preferred embodiment of the present invention used to generate a customer one-time unique purchase order number by a consumer.

DETAILED DESCRIPTION OF THE PREFERRED EMBODIMENTS

The present invention is related to U.S. Pat. Nos. 5,913,203, 5,937,394 and 5,956,699, the disclosures of which are all specifically incorporated herein by reference.

The preferred embodiment of the present invention is adapted for use in many kinds of financial transactions. For example, it can be used in credit card transactions, bank or debit card transactions, or electronic script transactions. Because of the versatility of the preferred embodiment, it can be used in connection with a wide variety of instruments that can be used in connection with such financial transactions. Thus, it can be used with electronic cards, software programs used in network applications, or telephones (especially telephones used in what is now being referred to as m-commerce, or mobile commerce). Moreover, it can be used whether such transactions are conducted in person, face-to-face, or whether such transactions are conducted by an indirect medium, such as a mail order transaction, a transaction conducted over a computer network (for example, the Internet), or a telephone transaction.

As is the case in most financial transactions, three parties are typically involved in completed financial transactions according to the present invention. A party makes a monetary payment. In the context of the following description, this is the first entity or customer. Another party receives the monetary payment, and this party can be a single party or two or more parties. In the context of the following description, the party or parties that are receiving the monetary payment are referred to as the second entity. Finally, there is at least one party, and usually multiple parties, that serve as intermediaries to allow the customer to transfer monetary value to the second entity. The intermediary group of one or more parties will be referred to in the context of the following description as a money source. Thus, the money source may be one or more banks, a credit card company or any other institution involved with issuance of credit cards or bank debit cards, such as a credit union or other institution, or a money source as described in U.S. Pat. No. 5,913,203.

In connection with the preferred embodiment, it is not necessary that the first entity use a real identity, although such an option is also acceptable. Instead, a pseudonym, such as a screen name or an alias, could be used to protect the first entity's privacy and provide additional security.

Although the first entity need not use a real identity, the first entity must establish an account with a money source. When the account is established, the first entity and the money source must agree upon a payment mechanism or protocol. In the case of a credit card or a bank card, this could be done in the same fashion as exists today, and the first entity could select a fictitious account name as is explained in greater detail in co-pending U.S. patent application Ser. No. 09/619,859. It is especially preferred that two different users not be allowed to select the same fictitious account name so that a fictitious account name also represents a unique identifier. However, the preferred embodiment could also be used in connection with a prepaid account. In such a scenario, the first entity could simply purchase a prepaid card and no real identity would ever be required.

When the first entity establishes an account with the money source, a user key must be selected. The user key can be a Personal Identification Number, or "PIN," similar to that which is currently in widespread use in the United States in connection with automated teller machines. Both the first entity and the money source must have access to the user key, which can be selected by either entity. In order to be able to retrieve this user key, the money source must create a record associated with the first entity that includes the user key and a first entity identifier (whether this be the real name of the first entity or a fictitious account name).

Once the first entity has established an account with the money source and a user key has been selected, the first entity must be supplied with the means to generate a customer one-time unique purchase order number ("Coupon"). As already described, this could be hardware or software, but, in either case, it will include a customer random number generator and a customer permutation variable that is correlated with a customer sequence number.

There is some debate, within the mathematical and cryptographic communities, as to what constitutes a "random number generator." At times, the term is used somewhat loosely, and sometimes it is used to refer to what is also commonly referred to as a "pseudo random number generator." In the context of the present invention, a "random number generator" shall be defined to include a pseudo-random number generator. The details of how a random number generator (or a pseudo-random number generator) works, and how they can be used to generate a series of random (or pseudo-random) numbers, are well known in the art of cryptography and will not be repeated here. (A general description of random number generators and various pseudo-random number generators, and a discussion of common implementation mistakes that are made when using pseudo-random generators, is set forth in *ICSA Guide to Cryptography* (McGraw-Hill 1999), by Randall K. Nichols, at pages 356, 399-406, and 702, the disclosure of which is specifically incorporated herein by reference.)

A person skilled in the art could choose one of many different "random number generators" known in the art for use in connection with the present invention, and any number of such devices will suffice, although it is probably most desirable, from a security standpoint, to use a cryptographic pseudo-random number generator. In an especially preferred embodiment, the "random number generator" is what has been referred to by H. D. Knoble as a "Portable Quasi-Random Number Generator." More specifically, it is especially preferred that the random number generator be an additive three part prime modulus multiplicative linear congruent random number generator which can be generated by the following algorithm:

$$RN=INT((R-(INT(R)))\times 10)$$

where RN is the random number, INT stands for an Integer function, and R is calculated as follows:

$$R=(SA/K4)+(SB/K8)+(SC/K12), \text{ where}$$

SA=K1×MOD(SA, K2)−K3×(SA/K2), but if SA is less than zero, SA=SA+K4,
SB=K5×MOD(SB, K6)−K7×(SB/K6), but if SB is less than zero, SB=SB+K8,
SC=K9×MOD(SC, K10)−K11×(SC/K10), but if SC is less than zero, SC=SC+K12, where SA, SB and SC are seed values, all K numbers are constants, and MOD is a Modulo function. The above-identified algorithm uses three additive parts, but an algorithm with additional (or, less preferably, fewer) additive parts could also be used. Additional details concerning Modulo and Integer functions can be obtained from VS FORTRAN Application Programming: Language Reference, Release 2.0, IBM (3rd Ed., September 1982), pages 215 and 216, the disclosure of which is specifically incorporated herein by reference.

The customer random generator is used to generate a sequence of numbers with qualities similar to that of a sequence of truly random numbers. By using a pseudo-random number generator, the sequence will be fixed for a given algorithm, using a given set of constants, starting from a given seed value. A number in such a sequence can be referenced by its position relative to an initial setting, and this shall be referred to as a sequence number. Thus, a string of one hundred numbers generated by a random number generator can be assigned sequence numbers of 1-100, respectively, which means that the fiftieth number in the string would be assigned the sequence number of 50.

Because the money source must also use a random number generator, the customer random number generator and the money random number generator must be synchronized so that they will achieve identical results when the customer sequence number and the money source sequence number are identical. If a money source wants a number of different customers to use the same random number generator but generate different sequences of numbers, such results can be obtained several ways. For example, different customers might have different initial seed values, different customers might have one or more different constants, different customers might have a different permutation variable as an initial setting, or two or more of these options might be employed.

When the first entity wishes to generate a Coupon, the first entity enters the user key into the hardware or software used to generate the Coupon. Once the user key is entered, it is combined with a customer permutation variable that is correlated with a customer sequence number to form a customer permutated user key. The combination can be done by any number of mathematical functions (simple examples of which are addition, subtraction, division and multiplication) or by any suitable algorithm or set of rules. The customer permutation variable and the customer sequence number can be correlated in many different ways, the simplest example of which is that they are identical. Another example of a simple correlation would be to vary the permutation variable according to a preselected algorithm in accordance with the customer sequence number, or through use of the customer sequence number as an input into the algorithm.

The customer permutated user key and the user insertion key are used as input variables in an algorithm to form a Coupon. In an especially preferred embodiment, the customer permutated user key is inserted into a user account number. Simple methods of insertion include addition and substitution, or a combination of the two. After a Coupon is generated, the customer sequence number is changed, and a new entry of the user key will result in generation of a new customer permutated user key and a new Coupon. Because generation of the Coupon can be done by a computer (whether it be a "traditional" computer or some other device that can be a host computer or a client computer, such as a chip located in an electronic card or telephone), for all practical purposes, the Coupon can be generated as soon as the user key is entered into the computer.

Once a Coupon is generated, it can be transferred to a second entity, along with a first identity identifier, to pay for goods or services and, in turn, the Coupon and the first identity identifier can be transferred to the money center.

When a customer's user key is entered into an input device, there is always a possibility of mistake due to human error. Accordingly, it is highly desirable to provide a mechanism to account for such mistakes. However, the mechanism should be controlled to avoid the possibility of an unacceptable compromise to security, as could be the case if unlimited errors in entry of the customer's user key are allowed. The preferred embodiment provides a mechanism to satisfy both desires by the method a Coupon is validated and by allowing the customer random number generator and the money source random number generator to be resynchronized from a first setting to a second setting.

A Coupon is validated when the money source determines that the Coupon is valid for the first entity identifier submitted with the Coupon. In order to determine what Coupons might be valid for the first entity, the money source determines what Coupons the first entity will generate, and the order in which they will be generated. One way that the money source can determine what Coupons will be generated by the first entity is to generate coupons from the same starting input that would be used by the first entity, using the same random number generator. In other words, the money source uses a money source random generator that uses the same algorithm as the customer random generator (including initial seed(s) and constants), using the same user key. Thus, when the money source generates a money source Coupon from a money source sequence number that is identical to a customer sequence number used by a customer to generate a Coupon, the money source Coupon should be identical to, and thus match, the Coupon. This, in turn, validates the Coupon.

Validation of a Coupon is very simple to implement when the customer sequence number and the money source setting are synchronized. The money source Coupon could be generated at the time the Coupon is submitted for validation, or it could already be generated, and stored, in a look-up table. However, there are reasons why such synchronization may not exist. For example, a customer might generate a Coupon but, for whatever reason, not use it. Alternatively, a consumer might make a mistake and not enter the correct user key, and thus generate an invalid Coupon. (Although the latter possibility could be avoided by storing the user key in the hardware/software and confirming that the user key entered is correct, such storage is undesirable since the existence of such a record compromises security).

In order to account for the possibility that the customer sequence number and the money source setting may not be synchronized, validation can be permitted if the Coupon matches any one of a preselected number of money source Coupons generated in series by the money source from an expected starting value of the customer sequence number. (Selection of the preselected number is a matter of design choice that involves a tradeoff between usability and security, and the number might be changed at different times or for different conditions.) Although such series could be generated at the time of submission of a Coupon for validation, it is especially preferred that the series be generated and stored as a sequential set that can be queried upon submission of a Coupon for validation. Using this methodology, once a Coupon is validated, the matching money source Coupon and all earlier created money source Coupons can be deleted from the sequential set. Then, since the sequential set now contains less than the preselected number of Coupons, one or more additional money source Coupons are generated to bring the population of money source Coupons back up to the preselected number (or a newly selected number).

The use of a sequential set of money source Coupons works well as long as Coupons are submitted for verification in correct sequential order. Normally, this should not be a problem. However, there may be instances where this could present a problem, such as use of a Coupon to pay for something ordered by mail. In order to account for such a possibility, the money source can store money source Coupons deleted from the sequential set in a recent history file, and this file can be maintained for a preselected length of time. Using this methodology, if a match with a money source Coupon stored in the sequential set does not validate a Coupon, a match with a money source Coupon stored in the recent history file can still validate it. However, the money source might also want to implement additional security measures when validating a Coupon by comparison with the recent history file. Thus, in the given example of a mail order, the money source might also require that the shipping address match an approved shipping address for the first entity. Alternatively, the money source might also require independent confirmation of the validity of the Coupon by contacting the first entity, e.g. by telephone or e-mail, if the value of the Coupon exceeds a threshold limit.

If a Coupon is not validated, the money source will reject it as invalid. The Coupon might be invalid due to error by the first entity, or due to error somewhere during its path of transmission to the money source, or due to fraudulent activity. Accordingly, it is highly desirable not to place a hold on activity by a customer whose first entity identifier has been used with an invalid Coupon until such activity exceeds a threshold level. Once this threshold level has been exceeded because a preselected number of invalid Coupons are not verified for the first entity, an invalid user account number condition can be triggered to prevent any further processing of Coupons submitted with the first entity identifier until the invalid user account number condition is removed.

If a first entity has submitted too many invalid Coupons, or has just gotten too far out of synchronization from the money source (e.g., a child playing with an electronic card), it may be desirable to resynchronize the customer random number generator with the bank random number generator. One easy way to do this is as follows. The first entity could contact the money source, enter the first entity's user key, and provide the money source with the resultant Coupon. The money source could then use this Coupon to determine what customer sequence number was used to generate the Coupon, and reset its records accordingly, as is illustrated in the following example:

Assume that the sequential set maintained by the money source contains 10 money source Coupons, that the first entity has previously successfully submitted Coupons for transactions 1-5, and that the first entity's customer sequence number is now 25. When the first entity contacts the money source, the Coupon that it will generate will be the $25^{th}$ Coupon in a string, but the sequential set maintained by the money source will only contain the $6^{th}$ through $15^{th}$ Coupons. Therefore, the money source will not generate a match until its $25^{th}$ money source Coupon is generated, at which point the customer random number generator and the money source random number generator will be resynchronized. Next, the money source will generate money source Coupons 26 through 35 and place them in its sequential set of money source Coupons for the first entity, and an invalid user account number condition, if set, can be removed.

Another way that the customer random number generator and the money source random number generator can be resynchronized is for the money source to provide the first entity with a new seed value to be input into the random number generator, but this would require some mechanism to allow such input. In the case of an electronic card, telephone or other hardware device, a special function key, followed by the input, might perform this.

Although the foregoing discussion of the preferred embodiment has focused on use of a single Coupon, additional security could be obtained by requiring use of two or more Coupons for a given transaction, especially if it exceeds a preselected threshold value or if a requirement for additional security is triggered. If two Coupons are required to process a given transaction, it is far less likely that a random guess or person without access to the valid user key and requisite algorithm could generate a correct sequence of Coupons. This fact can also be used to prove fraudulent or unauthorized use, or to check for such use. For example, suppose a first entity submits a Coupon for validation in connection with a certain transaction, and its validity is called into question. The first entity could be prompted to provide one or more additional valid Coupons, and if this could not be done, it would be a good indication of potential fraud.

In certain types of transactions, such as transactions over the Internet, there is some possibility that a first entity identifier could be intercepted and somebody might make fraudulent attempts to guess a valid Coupon for an intercepted first entity identifier without actual possession of authorized hardware or software that might be used to generate a valid Coupon. Once again, by requiring use of two or more valid Coupons, the potential for fraud could be reduced. Alternatively, the first entity could be asked to generate a Coupon using an incorrect user key. In this scenario, if the first entity does not actually have possession of the hardware or software to generate a Coupon, it would not be possible for the first entity to generate the Coupon that could be generated by the money source through use of the incorrect user key, the money source permutation variable and the money source sequence number.

Fraudulent activity might also be detected by the nature of invalid Coupons submitted for verification. When the money source receives a Coupon for verification, it is possible to work backwards from the Coupon to determine what user key and permutation variable were used to generate the Coupon for a given sequence number. Based upon what user keys were used in generating invalid Coupons, it might be possible to spot potential fraudulent activity. It is also possible to detect or deter fraudulent activity, and increase security, if the user key is periodically changed. This can be done when the first entity and the money source validly agree to change the user key, and the money source's records are changed accordingly (including the money source Coupons contained within the sequential set).

Although the foregoing detailed description is illustrative of preferred embodiments of the present invention, it is to be understood that additional embodiments thereof will be obvious to those skilled in the art. For example, the same inventive concepts disclosed herein could be used in a system in which a customer has two or more account numbers and/or identities, with the same or different user keys. In the case of an electronic card or telephone, this would allow the customer to select which account should be used (for example, to choose a business credit card for use with a business expense, a personal credit card for use with a personal expense, or a bank card at a local store for groceries and cash back). Alternatively, a customer might be permitted to use multiple user keys for the same account number and the same identity. This could allow some of the same functionality, or it could be used to classify the type or nature of the expense or transaction.

Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for providing multiple secure transactions between a first entity and at least one additional entity through use of a computer, comprising the steps of:
   (1) using the computer to generate a customer one-time unique purchase order number ("Coupon") for the first entity by the following steps:
      (a) combining a user key with a customer permutation variable that is correlated with a customer sequence number to form a customer permutated user key;
      (b) using a customer random number generator to generate a customer user insertion key that is correlated with the customer sequence number; and
      (c) generating a Coupon from a user account number by inserting the permutated user key into the user account number in accordance with an algorithm that uses the customer user insertion key;
   (2) transferring the Coupon and a first entity identifier to a second entity;
   (3) transferring the Coupon and the first entity identifier from the second entity to a money source repository;
   (4) using a second computer to create a sequential set of the money source repository having a preselected number of money source Coupons for the first entity by the following steps:
      (a) combining the user key with a money source permutation variable that is correlated with a money source sequence number to form a money source permutated user key;
      (b) using a money source random number generator to generate a money source user insertion key that is correlated with the money source sequence number;
      (c) generating a money source Coupon from the user account number by inserting the money source permutated user key into the user account number in accordance with the algorithm that uses the money source user insertion key, wherein the money source Coupon is correlated with the money source sequence number and stored in the sequential set, said money source Coupon being identical to the Coupon when the customer permutation variable and the money source permutation variable are identical;
      (d) changing the money source sequence number; and
      (e) repeating steps (a) through (d) as needed so that the sequential set has the preselected number of money source Coupons;
   (5) verifying that the Coupon is valid for the first entity by confirming that it is identical to a matching money source Coupon contained within the sequential set;
   (6) deleting the matching money source Coupon and all earlier created money source Coupons from the sequential set in the second computer;
   (7) changing the customer sequence number; and
   (8) repeating steps (2) through (7).

2. A method as recited in claim 1, wherein the second entity is comprised of a plurality of different entities.

3. A method as recited in claim 1, wherein the customer random number generator and the money source random number generator are resynchronized from a first setting to a second setting.

4. A method as recited in claim 1, wherein the customer sequence number is changed every time a Coupon is generated.

5. A method as recited in claim 1, wherein the user key is entered into an input device whose output is used to generate the Coupon.

6. A method as recited in claim 5, wherein the customer sequence number is changed every time the user key is entered into the input device.

7. A method as recited in claim 1, comprising the following additional steps:
   setting an invalid user account number condition if a preselected number of Coupons are not verified for the first entity; and
   terminating step (5) when the invalid user account number condition is set.

8. A method as recited in claim 1, wherein the account number is comprised of a fixed set of variables and a variable set of variables.

9. A method as recited in claim 8, wherein the customer permutated user key is inserted into the variable set of variables to form the Coupon.

10. A method as recited in claim 9, wherein the fixed set of variables is not changed by creation of the Coupon.

11. A method as recited in claim 10, wherein the account number consists of twenty numeric digits.

12. A method as recited in claim 11, wherein the variable set of variables contains nine or fewer digits.

13. A method for generating customer one-time unique purchase order numbers ("Coupons") through use of a computer, comprising the steps of:
   (1) in the computer, combining a user key with a permutation variable that is correlated with a sequence number to form a permutated user key;
   (2) in the computer, using a random number generator to generate a user insertion key that is correlated with the sequence number;
   (3) in the computer, executing an algorithm that uses the permutated user key and the user insertion key as input variables to form a Coupon that is correlated with the sequence number;
   (4) changing the sequence number in the computer; and
   (5) repeating steps (1) through (4) a plurality of times.

14. A method as recited in claim 13, wherein an electronic card generates the Coupons.

15. A method as recited in claim 14, wherein the user key is entered into an input device of the electronic card to generate the Coupon.

16. A method as recited in claim 15, wherein the customer sequence number is changed every time the user key is entered into the input device.

17. A method as recited in claim 16, wherein the account number is a twenty digit numeric number and the permutated user key is inserted into a variable set of nine or less digits contained within the account number.

18. A method as recited in claim 17, wherein the Coupon is readable by a magnetic card reader.

19. A method as recited in claim 18, wherein the algorithm inserts the permutated user key into the user account number.

20. A method for providing multiple secure transactions between a first entity and at least one additional entity, comprising the steps of:
   (1) creating a record associated with the first entity with a money source repository which includes a user account number, a user key and a first entity identifier;
   (2) generating a customer one-time unique purchase order number ("Coupon") for the first entity in a computer by the following steps:
      (a) in the computer, combining the user key with a permutation variable that is correlated with a sequence number to form a permutated user key;
      (b) in the computer, using a random number generator to generate a user insertion key that is correlated with the sequence number; and
      (c) in the computer, inserting the permutated user key into the user account number to form a Coupon that is correlated with the sequence number;
   (3) transferring the Coupon and the first entity identifier to a second entity;
   (4) transferring the Coupon and the first entity identifier from the second entity to the money source repository;
   (5) verifying that the Coupon is valid for the first entity;
   (6) changing the sequence number; and
   (7) repeating steps (2) through (5).

21. A method as recited in claim 20, wherein the record includes a set of one or more constants and one or more seeds used as an initial setting in the money source random number generator.

22. A method as recited in claim 21, wherein the record includes the permutation variable.

23. A method for providing multiple secure transactions between a first entity and at least one additional entity, comprising the steps of:
   (1) generating a customer one-time unique purchase order number ("Coupon") for the first entity through use of a computer by the following steps:
      (a) in the computer, combining a user key with a customer permutation variable that is correlated with a customer sequence number to form a customer permutated user key;
      (b) in the computer, using a customer random number generator to generate a customer user insertion key that is correlated with the customer sequence number; and
      (c) in the computer, generating a Coupon from a user account number by inserting the permutated user key into the user account number in accordance with an algorithm that uses the customer user insertion key;
   (2) transferring the Coupon and a first entity identifier to a second entity;
   (3) transferring the Coupon and the first entity identifier from the second entity to a money source repository;
   (4) creating a sequential set of the money source repository having a preselected number of money source Coupons for the first entity by the following steps:
      (a) combining the user key with a money source permutation variable that is correlated with a money source sequence number to form a money source permutated user key;
      (b) using a money source random number generator to generate a money source user insertion key that is correlated with the money source sequence number;
      (c) generating a money source Coupon from the user account number by inserting the money source permutated user key into the user account number in accordance with the algorithm that uses the money source user insertion key, wherein the money source Coupon is correlated with the money source sequence-number and stored in the sequential set, said money source Coupon being identical to the Coupon when the customer permutation variable and the money source permutation variable are identical;

(d) changing the money source sequence number; and
(e) repeating steps (a) through (d) as needed so that the sequential set has the preselected number of money source Coupons;

(5) verifying that the Coupon is valid for the first entity by
  (a) either confirming that it is identical to a matching money source Coupon contained within the sequential set, or
  (b) confirming that is identical to a matching money source Coupon contained in a recent history file that contains one or more money source Coupons deleted from the sequential set;

(6) deleting the matching money source Coupon and, if the matching source Coupon was contained in the sequential set, all earlier created money source Coupons from the sequential set;

(7) changing the customer sequence number; and (8) repeating steps (2) through (7).

24. A method as recited in claim 23, wherein the money source Coupons are only maintained in the recent history file for a specified length of time.

25. A method as recited in claim 23, comprising the further step of requiring independent verification of the validity of the Coupon before it is validated by step (5)(b).

\* \* \* \* \*